United States Patent [19]

Baker et al.

[11] 4,348,553

[45] Sep. 7, 1982

[54] PARALLEL PATTERN VERIFIER WITH DYNAMIC TIME WARPING

[75] Inventors: James K. Baker; Janet M. Baker, both of West Newton, Mass.

[73] Assignee: International Business Machines Corporation, Armonk, N.Y.

[21] Appl. No.: 165,466

[22] Filed: Jul. 2, 1980

[51] Int. Cl.³ .............................................. G10L 1/00
[52] U.S. Cl. ................................................ 179/1 SB
[58] Field of Search ............... 179/1 SB, 1 SD, 1 SC; 340/146.3 SY, 146.3 ED, 146.3 WD, 146.3 AQ; 364/728

[56] References Cited

U.S. PATENT DOCUMENTS

| | | | |
|---|---|---|---|
| 3,700,815 | 10/1972 | Doddington et al. | 179/1 SB |
| 3,849,762 | 11/1974 | Fujimoto et al. | 340/146.3 Q |
| 4,100,370 | 6/1978 | Juzuki | 179/1 SD |
| 4,256,924 | 3/1981 | Sakoe | 179/1 SD |

OTHER PUBLICATIONS

F. Jilinek, "Continuous Speech Recognition," Proc. IEEE, Apr. 1976, pp. 532–538, 556.

Primary Examiner—Mark E. Nusbaum
Assistant Examiner—E. S. Kemeny
Attorney, Agent, or Firm—Yen S. Yee

[57] ABSTRACT

A speech recognition system is disclosed which employs a network of elementary local decision modules for matching an observed time-varying speech pattern against all possible time warpings of the stored prototype patterns. For each elementary speech segment, an elementary recognizer provides a score indicating the degree of correlation of the input speech segment with stored spectral patterns. Each local decision module receives the results of the elementary recognizer and, at the same time, receives an input from selected ones of the other local decision modules. Each local decision module specializes in a particular node in the network wherein each node matches the probability of how well the input segment of speech matches the particular sound segments in the sounds of the words spoken. Each local decision module takes the prior decisions of all preceding sound segments which are input from the other local decision modules and makes a selection of the locally optimum time warping to be permitted. By this selection technique, each speech segment is stretched or compressed by an arbitrary, nonlinear function based on the control of the interconnections of the other local decision modules to a particular local decision module. Each local decision module includes an accumulator memory which stores the logarithmic probabilities of the current observation which is conditional upon the internal event specified by a word to be matched or identifier of the particular pattern that corresponds to the subject node for that particular pattern. For each observation, these probabilities are computed and loaded into the accumulator memory of all the modules and, the result of the locally optimum time warping representing the accumulated score or network path to a node for the word with the highest probability is chosen.

9 Claims, 6 Drawing Figures

PARALLEL PATTERN VERIFIER WITH DYNAMIC TIME WARPING

FIELD OF THE INVENTION

The present invention relates to digital pattern recognition systems and more particularly to such systems wherein input patterns are compared against a collection of stored prototype patterns.

BACKGROUND ART

In many applications of pattern recognition, there is a need to match a time-varying pattern against each of a collection of stored prototype patterns. A significant problem arises because a given pattern does not necessarily reoccur at a uniform rate. For short duration patterns a simple comparison between an observed pattern and a stored prototype may be made by such well-known techniques as cross-correlation, matched filters, or minimum distance in an appropriate metric.

For longer duration patterns, it is necessary to adjust the time alignment between the individual pieces of the observed pattern and the stored prototype. For example, U.S. Pat. No. 3,700,815 to G. R. Doddington discloses a system for speaker verification by matching a sample of a person's speech with a reference version of the same text derived from prerecorded samples of the same speaker. Acceptance or rejection of the person as the claimed individual is based on the concordance of a number of acoustic parameters, for example, format frequencies, pitch period, and speech energy. The degree of match is assessed by time aligning the sample and reference utterance. Time alignment is achieved by a nonlinear process which attempts to maximize the similarity between the sample and reference through a piece-wise linear continuous transformation of the time scale. The extent of time transformation that is required to achieve maximum similarity also influences the decision to accept or reject the identity claim.

The time alignment problem can be illustrated by a simple example. Let the patterns consist of strings of letters of the alphabet. An elementary portion of a pattern is represented by a single letter. The amount of disagreement between an elementary portion of the observed pattern and an elementary portion of a stored prototype is represented by the distance between the letters as to place in the alphabet.

TABLE I

| A | Y | M | B | P | W | C | observed pattern |
|---|---|---|---|---|---|---|---|
| D | W | R | E | Q | Z | H | prototype (stored) |
| 3 | 2 | 5 | 3 | 1 | 3 | 5 | distance |
|   |   |   |   |   |   |   | TOTAL DISTANCE: 22 |

In the example given in Table I, there is no time alignment problem and the total "distance" between the observed pattern is easily seen to be 22.

TABLE II

| A | Y | M | B | P | W | C |   |   | observed pattern |
|---|---|---|---|---|---|---|---|---|---|
| A | M | B | A | A | P | G | W | C | prototype (stored) |
| A | Y | M | B | P | W | C |   |   | Alignment |
|   |   |   |   |   |   |   |   |   | 1 deletion |
| A | M | B | A | A | P | G | W | C | 3 insertions |
|   |   |   |   |   |   |   |   |   | SUBSTITUTION DISTANCE: 0 |

In the example shown in Table II, there is an alignment problem with inserted and missing characters. Since there are no substitutions (changed letters) in Table II, it is easy to find the correct realignment.

TABLE III

| A | Y | M | B | P | W | C |   |   | observed pattern |
|---|---|---|---|---|---|---|---|---|---|
| D | R | E | C | D | Q | G | Z | H | prototype (stored) |
| A | Y | M | B | P | W | C |   |   | Alignment |
| D | R | E | C | D | Q | G | Z | H | 1 deletion |
| 3 | 5 |   | 1 |   | 1 | 3 | 5 |   | distance 3 insertions |
|   |   |   |   |   |   |   |   |   | SUBSTITUTION DISTANCE: 18 |

In the top half of Table III, there are substitutions as well as insertions and deletions. The correct realignment is no longer obvious at a glance. With a little analysis and searching, the alignment given in the bottom of the figure can be found. For longer, less well-behaved patterns, however, the problem can be much more difficult.

In the prior art, such alignment problems are usually tackled by a trial and error procedure. A guess is made for the alignment of each piece, then the alignment is readjusted to take into account the constraints on adjacent pieces, perhaps repeatedly. Other alignment techniques include linear, or piecewise linear, stretching or shrinking of a pattern, segmentation of the pattern into blocks and block matching, and various ad hoc procedures based on peculiarities of individual patterns. All of these techniques greatly increase in complexity and decrease in accuracy as the patterns get longer and/or more complex.

The alignment problem in fact has a general, optimal solution. As explained in "Optimal Stochastic Modeling as a Basis for Speech Understanding Systems", by J. K. Baker in Invited Papers of the IEEE Symposium on Speech Recognition, Apr. 15–19, 1974, Academic Press 1975, the well known technique of dynamic programming may be applied to search the space of all possible realignments to find the alignment which gives the best match. The term "best" as used here and hereinafter means the most probable or the one with the highest correlation score. The fundamental formula of this dynamic programming procedure is given in equation (1).

$$\gamma(j,t) = \max \gamma(i,t-1) \, a(i,j) \, b[i,j,p(t)] \quad (1)$$

where $\gamma(j,t)$ is a score for the partial match of position j in the prototype and position t in the observed pattern. The term $a(i,j)$ is the probability of going from position i to position j in the prototype for a single position step in the observed pattern. If i=j, there is a deletion; if i>j+1, there is an insertion. The term $b[i,j,p(t)]$ is the conditional probability of observed p(t) in the t position of the observed pattern when going from position i to position j in the prototype.

It is an object of the present invention to provide a speech recognition system which gives the optimal time alignment of the observed speech pattern and the stored prototypes.

It is another object to provide a pattern recognition system which matches a relatively long duration, time-varying input pattern against stored prototypes with optimal time alignment.

It is another object to provide a speech recognition system which employs dynamic programming for optimal time alignment of the observed speech pattern and the stored prototypes.

SUMMARY OF THE INVENTION

These and other objects are achieved by the present invention which provides a speech recognition system which employs a network of elementary local decision modules for matching an observed time-varying speech pattern against all possible time warpings of the stored prototype patterns. An elementary recognizer performs a spectral analysis of segments of the input speech pattern and correlates such patterns with stored spectral patterns representing each type of elementary segment. For each elementary speech segment, the elementary recognizer provides a score or vector indicating the degree of correlation of the input speech segment with the stored spectral pattern. A correlation score for each possible sound segment is sent by the elementary recognizer to each of the local decision modules which operate in parallel. Each local decision module receives the results of the elementary recognizer and, at the same time, receives an input from selected ones of the other local decision modules.

Each local decision module specializes in a particular node in the network wherein each node matches the probability of how well the input segment of speech matches particular sound segments. A network of nodes is a representation of all possible ways to pronounce a given word. A given node represents a particular place within the word. For example, the word "invention" may have nodes separated between each of the letters of the word or parts of the sounds for the word "invention". Each node is time displaced by the number of arcs or patterns traveled in the network. The subject system looks at each node at a time and observes the paths to that node at a given time. The best possible path for a word as a whole is determined by finding the best path leading up to each node.

While the known speech systems observe the correlation scores of the stored patterns against the input signal and select the best score, the system of the subject invention provides a network which computes an accumulated correlation score for any one path. The path represents an accumulation of segments or parts of a word or sound. One method used herein for obtaining the best match of a word is to determine all possible paths and produce an accumulated score that is finally used as compared with each local score.

In the subject system, each local decision module takes the prior decisions of all preceding sound segments which are input from the other local decision modules and makes a selection of the locally optimum time warping to be permitted. By this selection technique, each speech segment is stretched or compressed by an arbitrary, nonlinear function based on the control of the interconnections of the other local decision modules to a particular local decision module. Each local decision module includes an accumulator memory which stores the logarithmic probabilities of the current observation which is conditional upon the internal event specified by a word identifier, correlation score or word pronunciation of the particular pattern that corresponds to the subject node for that particular pattern. For each observation, these probabilities are computed and loaded into the accumulator memory of all the modules and the result of the input-transition combination with the highest probability held in a temporary register and the current observation from the accumulator memory provides a result to a partial results memory. This result is provided to the other local decision modules so that the module is now ready to process the next prototype pattern.

DESCRIPTION OF THE PREFERRED EMBODIMENTS

Figure 1:
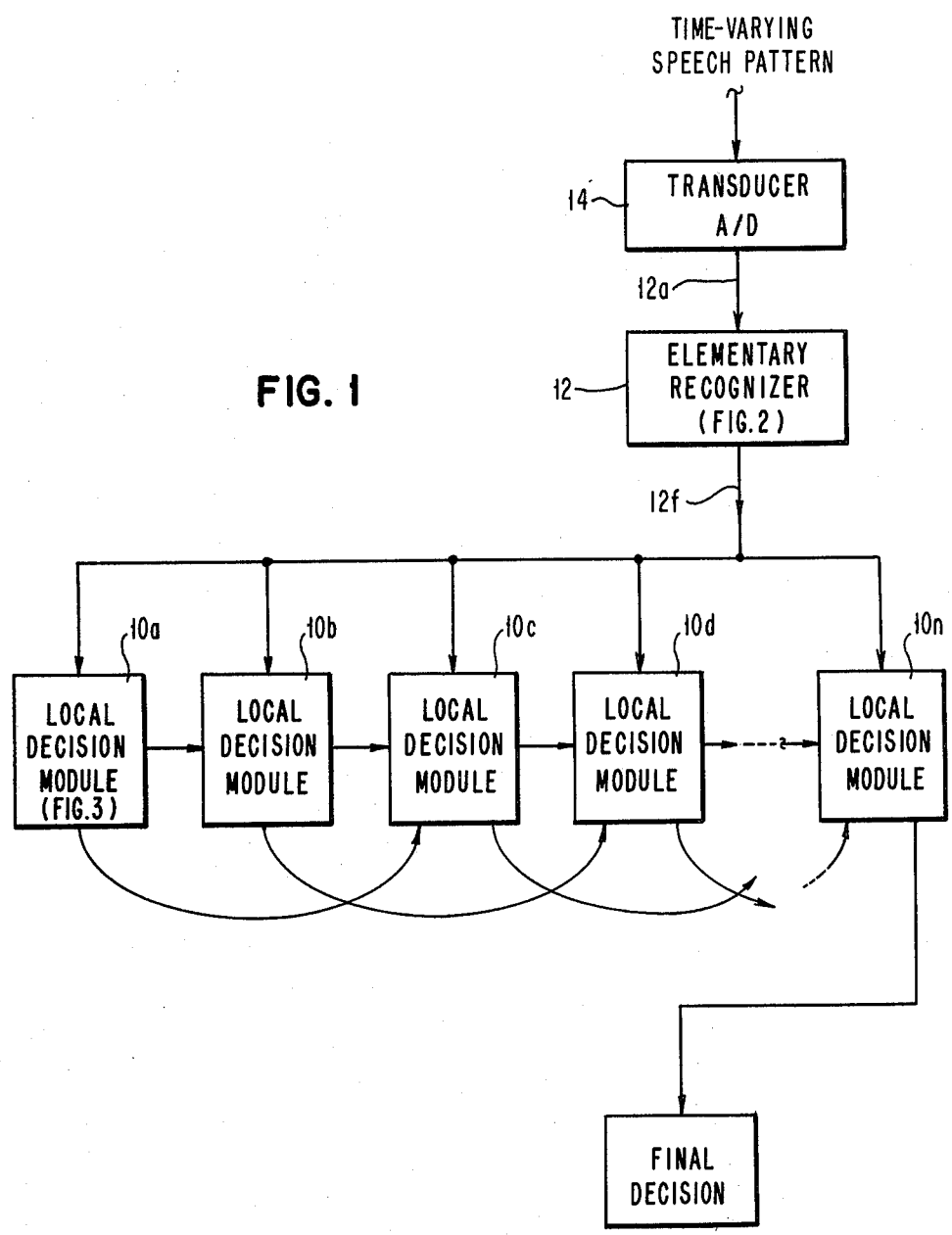
FIG. 1 is an overall block diagram of the system, illustrative of the present invention.

Referring to the drawings, FIG. 1 is an overall block diagram of the parallel pattern verifier system used for speech recognition, illustrative of the present invention.

Each prototype of each observed speech pattern is broken up into elementary segments. The number of "local decision modules" $10a$—$10a$ is the number of elementary segments in the longest prototype. The design decision of what to select as an elementary segment depends on the particular application. The system operates with any kind of elementary segments as long as two general properties are maintained. Each elementary segment must be sufficiently short so that no internal time-warping is required, and it must be possible for an "elementary recognizer" 12 to consistently classify the elementary segments as they are received through a transducer 14. In speech recognition, for example, various lengths of elementary segments have been successfully used with the system of the present invention: pitch periods (average duration 0.006 seconds), 10 millisecond clock-synchronous acoustic segments (selected once each 0.01 seconds), and steady acoustic-phonetic events (average duration 0.06 seconds). The upper limit on the duration of an elementary segment is determined by the constraint that no internal time realignment is allowed. There is no lower bound on the duration of an elementary segment, but the shorter an elementary segment, the more segments per prototype and the more local decision modules $10a$–$10n$ are needed.

Since each elementary segment is a fixed pattern not requiring any time-warping, the elementary recognizer 12 can employ any of the standard elementary pattern matching techniques known to those skilled in the art. The raw parameters are sampled for each elementary segment. One type of elementary recognizer is disclosed in U.S. Pat. No. 3,757,852 to Robinson wherein an input bit string pattern is segmented into different sections that are compared with portions of stored data words corresponding to different reference patterns. Output signals indicate the matches between preselected sections of the input bit string pattern and the stored reference patterns. This parameter vector is then compared with parameter vectors from elementary segments sampled during training. This comparison can be done by matched filters, analog or digital correlation pattern differencing, or any convenient Euclidean or non-Euclidean metric, or any pseudo-distance measure. The essential requirement is that the elementary recognizer 12 compare each elementary segment of the observed pattern with each elementary segment in a stored list and broadcast the result of the comparison to all of the local decision modules 10a–10n.

Figure 2:
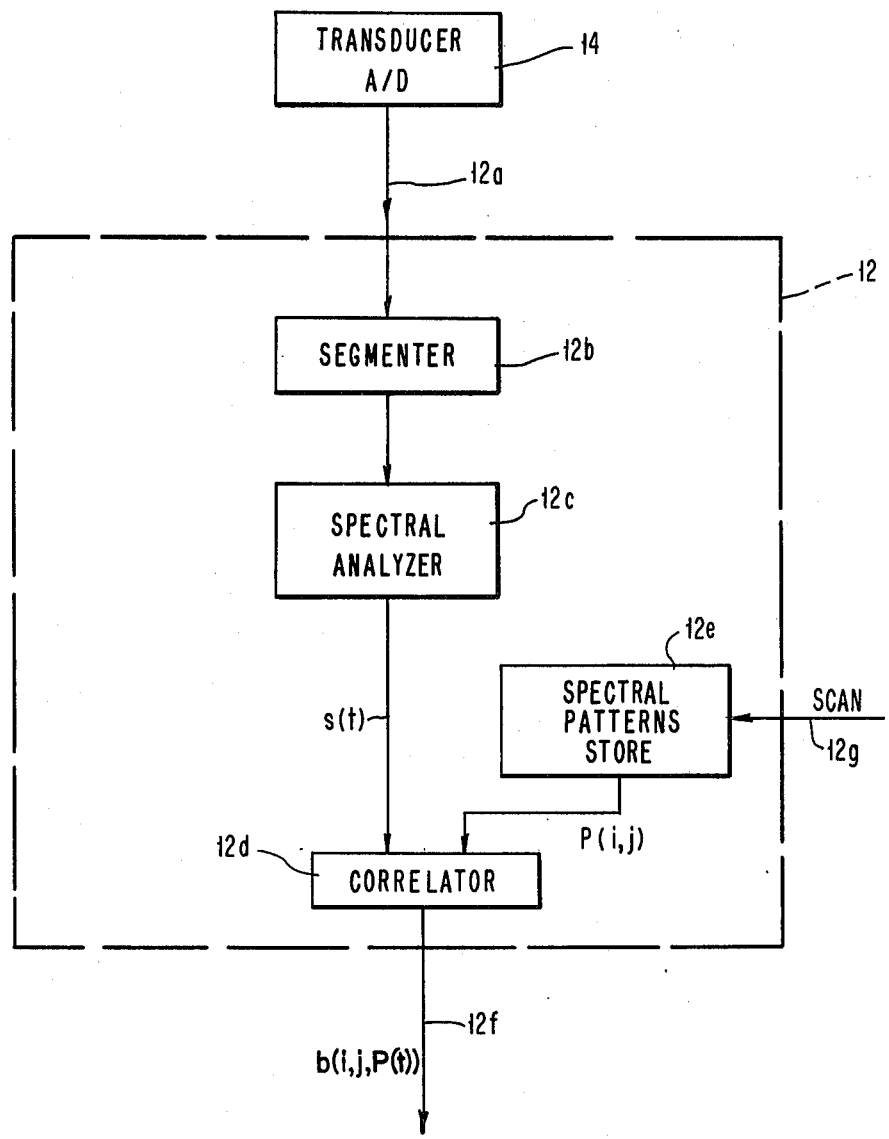
FIG. 2 is a functional block diagram of the elementary recognizer shown in FIG. 1.

The elementary recognizer 12 is shown in a more detailed block diagram in FIG. 2 for consistently classifying the elementary segments as they are received through the transducer 14. The elementary recognizer 12 includes a conventional segmentor 12b for receiving the speech sample in an input bit string pattern and segmenting it into different sections that are received in a spectral analyzer 12c which provides speech amplitude parameters in a conventional manner. The output of the spectral analyzer 12c is compared in a correlator 12d with portions of stored data words corresponding to different reference patterns in a spectral pattern store 12e.

The spectral pattern stoe 12e may comprise a read-only memory (ROM) which stores 64 reference sounds or spectral patterns. The memory device 12e is scanned by a scan control on line 12g so that for each segment outputted for segmenter 12b through the spectral analyzer 12c, there is provided a correlation score on line 12f for each of the 64 stored patterns that are scanned. Each of the 64 pattern correlation scores for a given input segment is stored via line 12f in the elementary recognizer results memory 56 of each local decision module 10a–10n. It is noted that in conventional pattern recognition systems, a single best correlation score is selected for a given input speech segment and that spectral pattern which produced the higher score would be used. By contrast, each of the 64 scores produced by scanning the stored patterns is held in the memory 56 of each local decision module 10a–10n while further processing and decision making occurs in a manner to be described in detail. Each memory 56 in a local decision module 10a–10n stores a set of correlation scores for each input segment and the stored spectral patterns.

It is to be understood that while the elementary recognizer 12 shown and described herein applies to a speech system, the subject invention covers any waveform pattern system involving a time or distance variable, such as, signature, electrocardiogram signals, electroencephalograms and the like. Thus, the spectral analyzer 12c in FIG. 2 showing the parameters of speech amplitude or power versus frequency would be substituted by a conventional waveform analyzer using parameters such as pressure, acceleration and direction, in a signature verification system. In any event, the elementary recognizer 12 is a conventional system that compares input waveform samples with a multiplicity of stored reference patterns and provides a correlation score for each of the stored patterns against the input sample or segment of the input sample.

Figure 3:
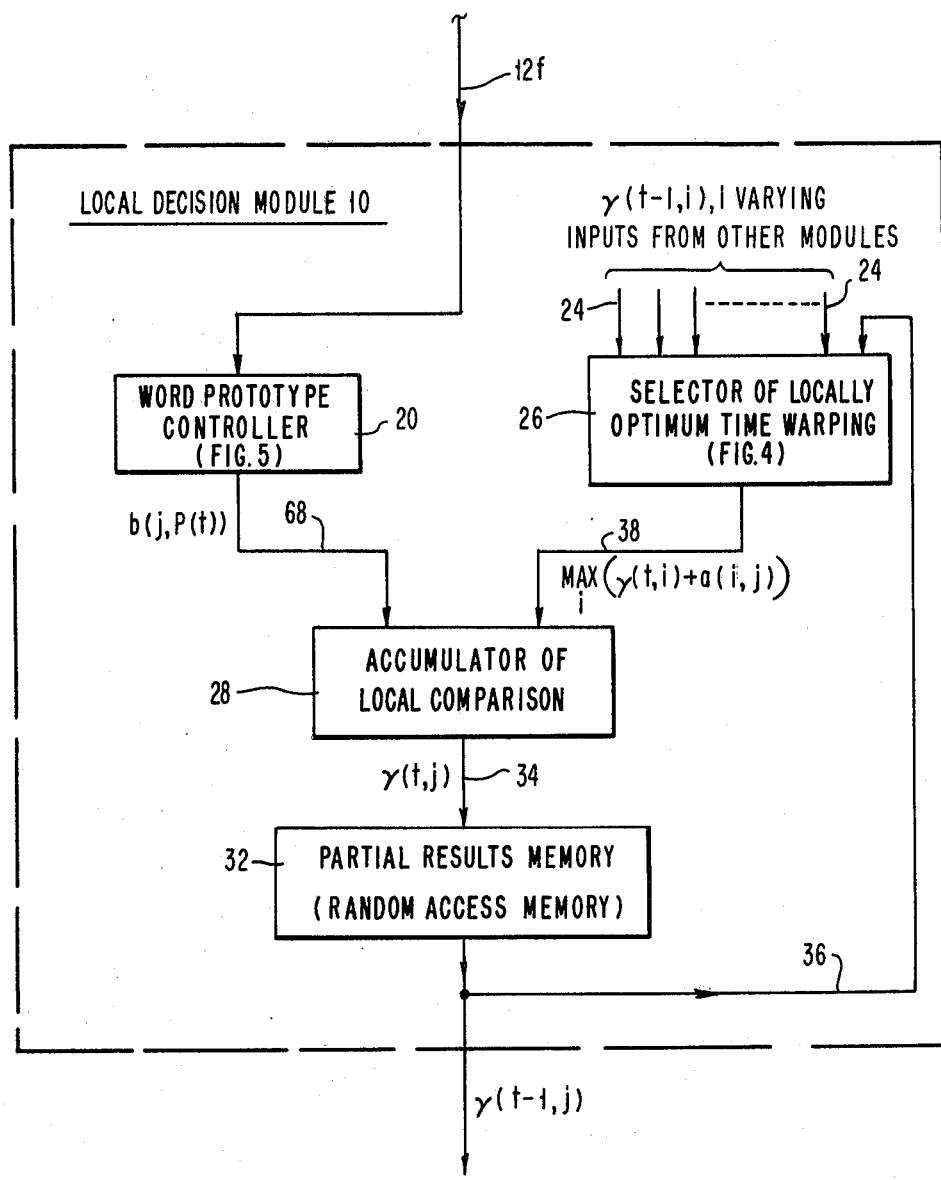
FIG. 3 is a block diagram of the local decision module, employed in the system.

An embodiment of a local decision module is shown in FIG. 3. An essential element of each module is a word prototype controller 20 having a scrambled index memory 22, shown in FIG. 5, which allows the results of the elementary recognizer 12 to be broadcast to all of the local decision modules at the same time. Each local decision module 10a–10n receives the results of the elementary recognizer 12 on line 12f and, at the same time, receives inputs on lines 24 from selected ones of the other local decision modules in a manner to be explained below. Generally, each local decision module specializes in a particular node in the network wherein each node matches the probability of how well the input segment of speech matches the particular sound segments in the sounds of the words spoken. Each local decision module takes the prior decisions of all preceding sound segments which are input from the other local decision modules and makes a selection in a selector 26 of the locally optimum time warping to be permitted. By this selection technique, each speech segment is stretched or compressed by an arbitrary, nonlinear function based on the control of the interconnections of the other local decision modules to a particular local decision module. An accumulator memory 28 of the local comparison stores the logarithmic probabilities of the current observation which is conditional upon the integral event specified in the word prototype controller 20 by a word identifier, correlation score, or word pronunciation of the particular pattern that corresponds to the subject node for that particular pattern. For each observation, these probabilities are computed and loaded into the accumulator memory 28 of all the modules 10–10n and, the result of the best input-transition combination from a temporary storage register 30 in the selector 26 shown in FIG. 4, and the current observation from the accumulator memory 28 provides a result to a partial results memory 32. This result is provided to the other local decision modules 10a–10n so that the module is now ready to process the next prototype pattern.

The components of the local decision module of FIG. 3 will be explained in terms of equations (1), which in the fundamental equation for the dynamic programming solution to the problem of the maximum log probability with nonlinear time warping of a hidden Markov process.

$$\gamma(t,j) = \max_i [\gamma(t-1,i) + a(i,j)] + b[j,p(t)] \tag{1}$$

There is one local decision module 10a–10n for each value of j. The computation proceeds with t going from one up to its maximum value in steps of one. That is, t=1, 2, 3, . . . , T with all the local decision modules computing with the same value of t during a given cycle in the computation. At the end of cycle t, the partial results memory 32 of module j will hold $\gamma(t,j)$ as expressed in equation (1). $\gamma(t,j)$ on line 34 represents the log probability for the best partial path which winds up at state j in the word prototype at time t. Stated another way, $\gamma$ represents the best path to arrive at a given node including all observations.

A network of nodes is a representation of all possible ways to pronounce a given word. A given node represents a particular place within the word. For example, the word "invention" may have nodes separated between each of the letters or the word or parts of the sounds for the word "invention". Each node is time displaced by the number of arcs or patterns traveled in the network.

The symbol $\gamma(j,t)$ represents the present accumulated score up to and including the present score along the best possible path in the network. The symbol $B(i,j,p,(t))$ represents a correlation source for a single elementary pattern segment at a particular time where an input segment (s,t) has a stored pattern (p,i,j). While the known speech systems observe the correlation scores of the stored patterns against the input signal and select the best score, the system of the subject invention provides a network which computes an accumulated correlation score for any one path. The path represents an accumulation of segments or parts of a word or sound. One manner of obtaining the best pronunciation of a word is to write down all possible paths and produce an accumulated score. It is the accumulated score that is finally used as compared with each local score.

In this speech system where there is determined which word was actually spoken, rather than observing a word as a whole, the system looks at each node at a time and observes the paths to that node at a given time. The best possible path for a word as a whole is determined by finding the best path leading up to each node. Thus, for each node a best score is provided. For each t, where t is a segment number, each node j is looked at to find $\gamma(j)$.

Consider each node as being a local decision module or a fractional part of a word where j is equal to a fraction of a prototype word pattern. A network of nodes corresponds to a pattern while a path corresponds to a particular pronunciation of a word. In this fashion, the best possible path for this word is computed through the network of nodes.

Referring again to FIG. 3, at the beginning of cycle t, the partial results memory 32 of module j contains $\gamma(t-1,j)$ as indicated on line 36. The selector 26 of locally optimum time warping receives the input on lines 24 from other modules and the input on line 36 from the partial results memory 32 of its own module. These inputs are just the values $\gamma(t-1,i)$, for varying i. Since different values of i correspond to different positions within the prototype of the word, selection of a different value of i from time (t-1) to be connected to state j at time t represents the selection of a locally optimum dynamic time warping. The output on line 38 from the selector 26 of locally optimum time warping will be the term $$(Max \gamma(t-1,i)+a(i,j))$$

from the right hand side of equation (1).

Figure 4:
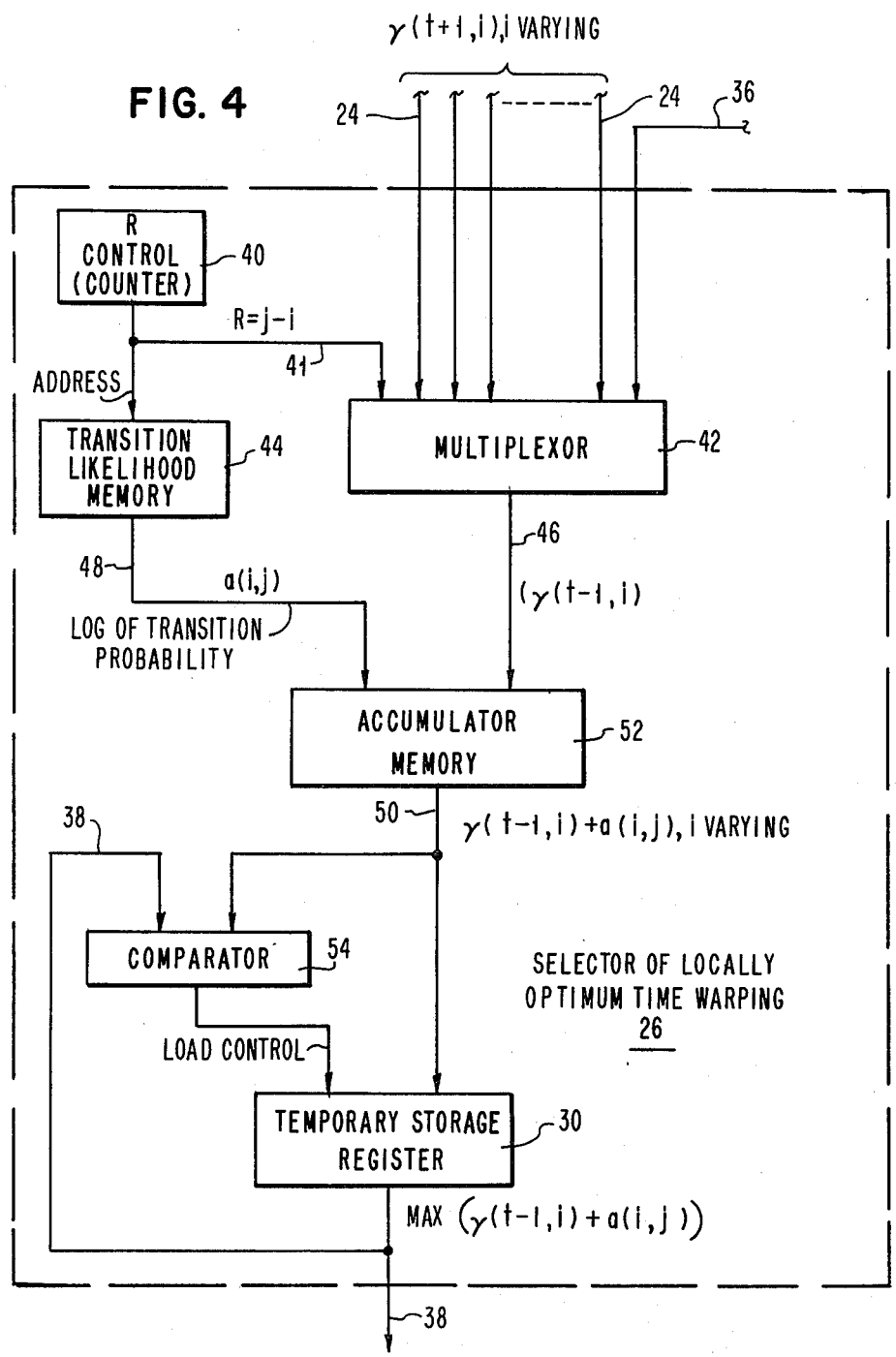
FIG. 4 is a block diagram of the selector of locally optimum time warping employed in each local decision module.

The selector 26 of locally optimum time warp block is shown in greater detail in FIG. 4. An R control 40 is simply a counter that controls a multiplexor 42 and provides the address for a transition likelihood memory 44 corresponding to each value i. In the preferred embodiment, R just counts through the various values of j—i as i varies. For a given value on the R counter 40, the output 46 of the multiplexor 42 will be $\gamma(t-1,i)$ and the output 48 of the transition likelihood memory 44 will be a(i,j), for the corresponding i. The output 50 of the accumulator 52 will therefore be $(\gamma(t-1,i)+a(i,j))$.

The operation of the temporary storage register 30 and the comparator 54 will be described for the specific case j=4 and R=j−i ranging from 0 to 3, so i ranges from 4 down to 1, but it is clear that the same mechanism works in the general case. At the beginning of a cycle t, the temporary storage register 30 is cleared. For R=j−i=0, then i=j=4 and the comparator 54 compares zero, from line 38 the cleared temporary storage register 30, with $(\gamma(t-1,4)+a(4,4))$ on line 50 from the accumulator memory 52. Hence, $(\gamma(t-1,4)+a(4,41)$ will be loaded into the temporary storage register 30. When the R control counter 40 goes to R=1, then j−i=1 so i=3. Thus, the comparator 54 will be comparing $(\gamma(t-1,3)+a(3,4))$ with the contents of the temporary storage register 30, which is now $(\gamma(t-1,4)+a(4,4))$. If $\gamma(t-1,3)+a(3,4)>\gamma(t-1,4)+a(4,4)$, then the comparator 54 will cause the temporary storage register 30 to be loaded with $(\gamma(t-1,3)+a(3,4))$. In any case, the temporary storage register 30 will wind up containing the larger of these two values. That is, the temporary storage register 30 will hold $$\underset{i=3,4}{Max} (\gamma(t-1) + a(i,4)).$$

When the R control counter 40 goes to R=2, then j−i=2 so i=2. The comparator will compare:

$$(\gamma(t-1,2) + a(2,4)) \text{ and } \underset{i=3,4}{Max} (\gamma(t-1,i) + a(i,4)).$$

The comparator will select the larger of these two values and the temporary storage register 30 will then contain:

$$\underset{i=2,3,4}{Max} (\gamma(t-1,i) + a(i,4)).$$

When R=3, the same operation will be performed for i=1 and the temporary storage register 30 will contain:

$$\underset{i=1,2,3,4}{Max} (\gamma(t-1,i) + a(i,4)),$$

which is the desired output.

Figure 5:
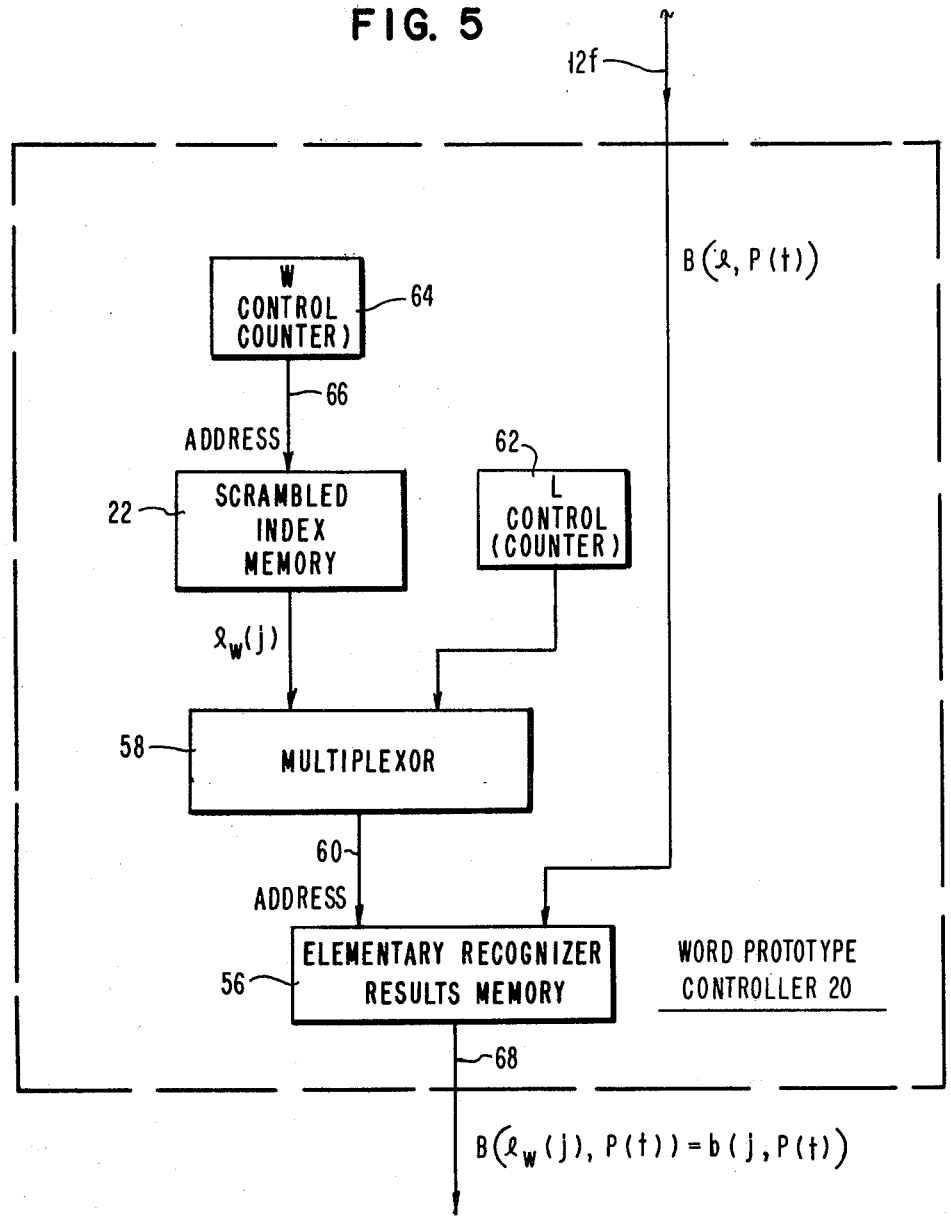
FIG. 5 is a block diagram of the word prototype controller employed in each local decision module.

The word prototype controller 20 is shown in greater detail in FIG. 5. The term b[j,P(t)] in equation (1) is not computed directly. Rather, a finite alphabet L of phonetic symbols is determined and or each w and for each state j for the prototype for the word w there is associated a label $l \in L$ and b(j,P(t)) is taken to be B (l,P(t)), where B (l,P(t)) in the log probability of the label l producing the observed parameter vector for time t, P(t).

The elementary recognizer 12 computes the correlation values of B(l,P(t)) for all values of $l \in L$. These values are then broadcast on lines 12f to all of the local decision modules 10a–10n. Each local decision module stores the correlation values of B(l,P(t)) in its own elementary recognizer results memory 56. During this phase of the computation, a multiplexor 58 in FIG. 5 is set such that the address on line 60 for the elementary results memory 56 is set by an L control counter 62. It is this operation of making many local copies of the correlation values B(l,P(t)) that allows the efficient implementation of parallel computation.

During the second phase of the computation, the address 60 of the elementary results memory 56 is set by the scrambled index memory 22 which holds the value of $l_\omega(j)$ for the current word w specified by a W control counter 64 on its output line 66. Thus, the output of the elementary results memory 56 will be $B(l_\omega(j), P(t))$ or in other words, b(j,P(t)). This output is provided on line 68 and connects from the word prototype controller 20 to the accumulator 28 of local comparison shown in FIG. 3.

Referring again to FIG. 3, the accumulator 28 of local comparison block is simply an accumulator which adds (Max $\gamma(t-1,i)+a(i,j)$) on line 38 and b(j,P(t)) on line 68. Hence, according to equation (1), its output on line 34 is $$\gamma(t,j) = Max (\gamma(t-1,i)+a(i,j)+b(j,P(t)).$$

The value $\gamma(t,j)$ from the accumulator 28 is then brought back on line 34 to the partial results memory 32 to finish cycle t and to be ready for cycle t+1. The partial results memory 32 is simple a RAM memory whose address is set by the W control counter 64 in the word prototype controller 20, so there is a separate $\gamma_\omega(t,j)$ for each word w.

The scrambled index memory 22 of the word prototype controller 20 shown in FIG. 5 contains information which is specialized for each local decision module. For each prototype pattern determined by W control counter 64 on line 66, the scrambled index memory 22 applies control to the elementary recognizer results memory 56, which causes the appropriate result to be selected for the given position in the given prototype.

The same W control on line 66, of the word prototype controller 20 shown in FIG. 5, and the same R control on line 41, out of the R control counter 40 shown in FIG. 4, is applied to all the local decision modules 10a-10n. This is essential so that each module will be able to make available to other modules the required ifnormation just as it is needed. The W control 64 determines which prototype is being worked on at a given time. The R control 40 determines what time alignment adjustment is being considered and can also be used to control the path through a more complicated prototype structure.

A typical mode of operation would be (1) input an elementary segment, (2) broadcast the results of the elementary recognition to all the local decision modules 10a-10n, (3) cycle through all stored prototypes by varying the W control 64, and (4) for each value of the W control, cycle through all possible values for the R control 40 to allow all possible local time alignment adjustments. The total array of local decision modules 10a-10n then efficiently implements equation (2) below for the entire collection of prototypes simultaneously. Equation (2) is equivalane to equation (1) above except that the logarithm has been taken of both sides to convert multiplication to addition. The equation (2) provides the means for determining the optimal score for the best possible path to a node j at a particular time. The equation also has added to it the best possible way to get to the previous adjacent node w.

$$\log (\gamma_\omega(j,t)) = \text{Max}(\log (\gamma_\omega(i,t)) + \bar{a}_w(i,j) + \bar{b}_w(i,j,P(t))) \quad (2)$$

Where $\bar{a}_w(i,j)$ depends on the value of the R control 26 and is supplied by the transition likelihood memory 44 of the selector 26 shown in FIG. 5. For each position i, the value of $\log (\gamma_\omega(i,t-1) + \bar{a}_w(i,j))$ is formed in accumulator memory 52. This sum is constantly compared with the value in the temporary storage register 30. Register 30 is cleared at the beginning of each cycle of R control values and is loaded from accumulator memory 52 whenever the accumulator value is greater. As the systems cycles through the different control values of R, it runs through different (i,j) pairs shown in equation (2) representing the probability of going from position i to position j, and decides the value of i which maximizes it. Thus, the temporary storage register 30 will eventually contain Max $(\log (\gamma_\omega(i,t-1) + \bar{a}_w(i,j)))$. The value of $\bar{b}_w(i,j,P(t))$ is retrieved from the elementary recognition results memory 56 under the W control 64 by way of the scrambled index memory 22 shown in FIG. 5.

Accumulator 28 of the local decision module shown in FIG. 3 thus has:

$$\text{Max} (\log (\gamma_\omega(i,t-1) + \bar{a}_w(i,j) + \bar{b}_w(i,j,P(t)))$$

which is stored in the partial results memory 32 to make $\log (\gamma_\omega(j,t))$.

In FIG. 1, each local decision module is connected only to itself and to the two previous modules. This structure allows for arbitrary time compression, i.e., deletion of segments from observed pattern, and allows for time stretching, i.e., insertion of segments, up to a factor of 2-to-1. However, the local decision modules can be connected in any pattern whatsoever. The pattern chosen should be determined by the process being modelled. The extent of time realignment is completely determined by the R control and the interconnection pattern of the local decision modules.

Figure 6:
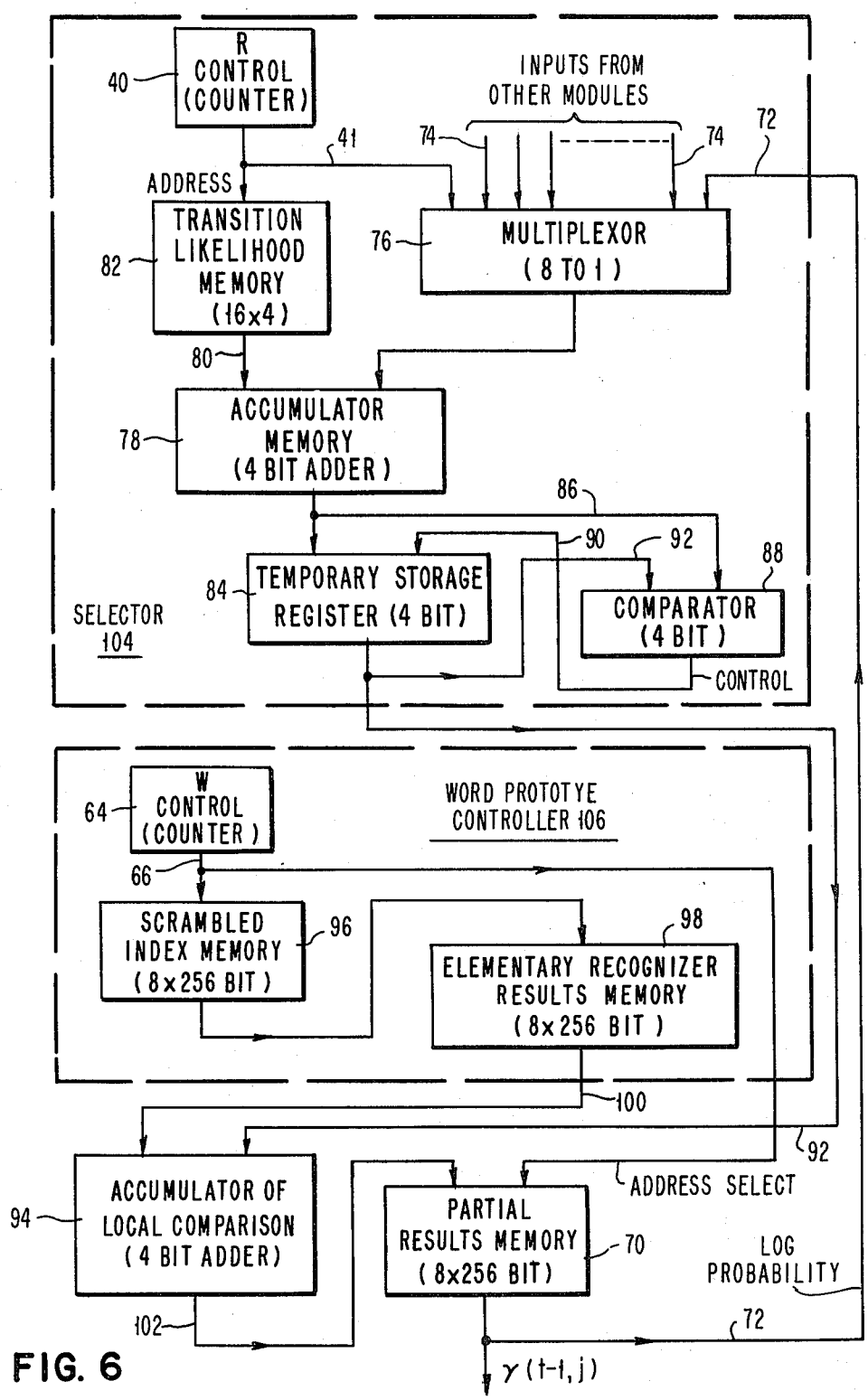
FIG. 6 shows a circuit diagram illustrating the hardware used in a local decision module to match the observed pattern against all possible time warpings of the stored prototype patterns.

FIG. 6 shows a circuit diagram illustrating the hardware used in a local decision module to match the observed pattern against all possible time warpings of the stored prototype patterns. The local decision module provides for 256 stored prototypes. By means of parallel operation of a separate comparison module for each node in the general pattern prototype, the system can match all 256 prototypes against a sequence of observations at a rate better than 1000 observations per second.

All numbers in the system are logarithms of probabilities. Multiplication of independent probabilities is performed by adding their logarithms. Since the log function is monotone, comparison of probabilities is performed by comparison of their logarithms. A partial results memory 70 comprises a 256×8 bit random access memory and contains the log-probability of the best match up to, but not including, the current observation. The partial results memory 70 is the same in function and operation as the partial results memory 32, shown in FIG. 3. Similarly, other hardware elements shown in FIG. 6 have the same function and operation as their counterpart elements shown and described above with respect to FIGS. 3, 4, and 5. In this connection, the W control counter 64 and the R control counter 40 shown in FIGS. 5 and 4, respectively, are shown represented by the same numerals in FIG. 6.

The W control counter 64 provides a current word address on line 66 which selects in the partial results memory 70 which of the 256 prototypes is being undated. Memory 70 is an 8×256 bit random access memory. Each one of the local decision modules 10a-10n operate on the same word, at any given time, from the W control counter 64. For each observation, the W control counter 64 steps the local decision modules through each of the 256 prototypes and, then, the next observation is prepared.

Each local decision modules receives an input from its own partial results memory 70 on line 72 as well as from the partial results memories of up to seven other local decision modules as shown by the inputs 74 leading into a multiplexor 76 since multiplexor 76 is an 8 to 1 multiplexor and is controlled on line 41 by the R control counter 40. Multiplexor 76 selects one of the eight inputs and the input log-probability is added in an accumulator memory 78 to the log of the transition probability received on line 80 from a transition likelihood memory 82. The accumulator memory 78 is a 4-bit adder while the transition likelihood memory 82 comprises a 16×4 random access memory. A temporary storage register 84 stores the best combination of the input plus the log of transition probabilities received on line 86 from the accumulator memory 78. The temporary storage register 84 is successively updated via a 4-bit comparator 88 on its output line 90 as the R output from the R control counter 40 ranges from 1 to 8 since the temporary storage register 84 is cleared when the W control counter 64 is incremented.

As stated, the best combination of the input plus the log of transition probability is provided by the temporary storage register 84 on line 92 to both the comparator 88 and to an accumulator 94 of the local comparison. Accumulator 94 is a 4-bit adder.

For each node in the general pattern prototype, there is an identifier specifying for each of the 256 patterns the internal event which corresponds to that node for that particular pattern. The scrambled index memory 96 stores such identifiers. For convenience, the number of identifiers has been set at 256, but the identifier set can be extended by increasing the word length of the scrambled index memory 96 and the number of words in the elementary recognizer results memory 98. For the specific application of speech recognition, the scrambled index memory is a phonetic dictionary comprising an 8×256 bit random access memory. If the set of patterns to be matched against is fixed, the transition likelihood memory 82 and the scrambled index memory 96 could comprise read-only memories.

The elementary recognizer results memory 98 is a 4×256 bit random access memory and holds the log-probabilities of the current observation conditional on the internal events specified by the identifier from the scrambled index memory 96. For each observation, these probabilities are computed by a central processor and loaded in parallel into the elementary recognizer results memories 98 of all the local decision modules 10a-10n. the accumulator 94 of the local comparison adds the results of the best input-transition combination from the temporary storage register 84 on line 92, with the current observation from the elementary recognizer results memory 98 received on line 100, and provides the results on line 102 to the partial results memory 70. At this time, the local decision module is ready to process the next prototype pattern by incrementing W from the W control counter 64.

While the local decision module shown and described with reference to FIG. 6 involves specific hardware for selecting from 256 prototypes being updated in a system where 8 local decision modules are employed, it should be apparent that the local decision module shown in FIG. 6 is essentially the same in function and operation as the local decision module shown in FIGS. 3, 4, and 5. Specifically, referring to the FIG. 3 and FIG. 6, the partial results memory 32 shown in FIG. 3 is the same as the partial results memory 70 shown in FIG. 6. The selector 26 of locally optimum time warping shown in FIGS. 3 and 4 are similar to the selector 104 shown in dotted line in FIG. 6 and including the multiplexor 76, the accumulator memory 78, the transition likelihood memory 82, the comparator 88, and the temporary storage register 84. Since also included is the R control counter 40. Furthermore, the word prototype controller 20 shown in FIG. 5 is similar to the word prototype controller indicated by dotted line 106 in FIG. 6 that includes W control counter 64, the scrambled index memory 96, and the elementary recognizer results memory 98. Finally, the accumulator 28 of the local comparison shown in FIG. 3 is similar to the 4-bit adder or accumulator 94 shown in FIG. 6.

While the invention has been described in its preferred embodiments, it should be understood that other forms and embodiments may be made without departing from the true scope of the invention.

Having thus described my invention, what I claim as new, and desire to secure by Letters Patent is:

1. A speech recognition system, comprising:
   an elementary recognizer for classifying the elementary segments of an observed speech pattern as they are received, said elementary recognizer including correlation means for producing at an output node of said elementary recognizer a score of correlation of said elementary segments with stored spectral speech patterns; and
   a plurality of local decision modules each connected to said output node for receiving said score of correlation; said plurality of local decision modules being connected at node points in a network wherein different network paths through the nodes and their corresponding local decisions modules represent an accumulation of speech segments constituting different pronunciations of said speech pattern, the input of each said local decision module connected to said correlation means to receive the measures of correlation;
   each local decision module specializing in a particular network node and including, means for determining the probability of how well the input segment of speech matches the particular sound segments associated with a given node, means for receiving from the other local decision modules the prior correlation scores of all preceding sound segments, means for selecting the locally optimum time warping of each segment of speech which are input from other local decision modules, and accumulator memory means for providing an accumulated correlation score for any one path in the network of local decision modules, said path representing an accumulation of segments or parts of a word or sound;
   whereby the accumulated correlation score represents the most probable pronunciation of said speech pattern and the best recognition match derived from all the possible paths in the network of local decision modules.

2. A system as recited in claim 1, wherein said means for selecting the locally optimum time warping includes a transition likelihood memory which provides the logarithmic probabilities of the current observation for the particular speech segment prototype at a given node.

3. A system as recited in claim 1, further comprising a word prototype controller at each local decision module for providing, to said accumulator memory means, prototype speech information which is specialized for its respective module.

4. A system as recited in claim 3, further comprising, in each local decision module, a partial results memory connected to the output of said accumulator memory means for receiving, for each observation of a speech segment, both the result of the base input-transition probabilities from other modules and the current local observation from said accumulator memory means, said partial results memory providing its accumulated results to the other local decision modules.

5. A system as recited in claim 1 wherein each local decision module is arranged in a network of nodes which is a representation of the possible ways to pronounce a given word, and further comprising timing means at each local decision module for time displacing each node by the number of arcs or patterns traveled in said network.

6. A system as recited in claim 1, wherein each local decision module includes a means for calculating the highest input transition probabilities from each of the local decision modules, and means for providing said highest input transition probabilities to the other local decision modules so that the subject module is ready to process the next prototype pattern.

7. A system as recited in claim 1, wherein said accumulator memory means in each local decision module stores said logarithmic probabilities of the current observation in accordance with the following fundamental equation for the dynamic programming solution to the maximum log probability with nonlinear time warping of a hidden Markov process;

$$\gamma(t,j) = \underset{i}{\text{Max}} [\gamma(t-1,i) + a(i,j)] + b[j,p(t)]$$

wherein $\gamma(t,j)$ represents the log probability for the best partial path which winds up at state j in the word prototype at time t thereby presenting the best path to arrive at a given node including all observations;

$t = 1, 2, 3, \ldots, T$ with all the local decision modules computing with the same value of t during a given cycle in the computation;

$\gamma(j,t)$ represents the present accumulated score up to and including the present score along the best possible path in the network;

the symbol $b[j,p(t)]$ represents the correlation score for a single elementary pattern segment at a particular time where an input segment (s,t) has a stored pattern (p,i,j);

the term $a(i,j)$ is the probability of going from position i to position j in the prototype for a single position step in the observed pattern;

whereby the different values of i correspond to different positions within the prototype of a given word, and selection of a different value of i from time $(t-1)$ to be connected to state j at time t represents the selection of a locally optimum dynamic time warping.

8. A system as recited in claim 7, wherein said selector means includes multiplexor means for receiving and multiplexing the dynamic time warping outputs from each of the other local decision modules $(\gamma(t-1,i))$;

a transition likelihood memory which provides the log of transition probability $(a(i,j))$ of going from position i to position j in the prototype for a single position step in the observed pattern;

an accumulator memory which receives the outputs from said transition likelihood memory and said multiplexor and provides the sum of said outputs;

and comparator means connected to the output of said accumulator memory for comparing said output with other outputs for different values of i representing different positions of the prototype of a given word thereby selecting a locally optimum dynamic time warping Max $\gamma(t-1,i)+a(i,j)$.

9. A system as recited in claim 8, wherein an accumulator of local comparison adds the locally optimum time warping $$\underset{j}{\text{Max.}} (\gamma(t,i) + a(i,j))$$

provided by said selector means to a correlation score $b(j,P(t))$ provided by a word prototype controller.

* * * * *

UNITED STATES PATENT AND TRADEMARK OFFICE
CERTIFICATE OF CORRECTION

PATENT NO. : 4,348,553
DATED : September 7, 1982
INVENTOR(S) : James K. Baker and Janet M. Baker It is certified that error appears in the above-identified patent and that said Letters Patent is hereby corrected as shown below:

Column 5, line 19, "stoe" should read --store--;

Column 6, line 29, "equations" should read --equation--;

Column 7, line 24, "$\gamma(t-1j)$" should read --$\gamma(t-1,j)$--;

Column 12, line 59, "base" should read --best--.

Signed and Sealed this

Twenty-eighth Day of January 1986

[SEAL]

Attest:

DONALD J. QUIGG

Attesting Officer

Commissioner of Patents and Trademarks